Dec. 11, 1923.

M. H. BALLARD

PRESS

Filed Oct. 29, 1920

INVENTOR.
Milton H. Ballard
By his Attorney
Nelson Horne

Patented Dec. 11, 1923.

1,476,680

UNITED STATES PATENT OFFICE.

MILTON H. BALLARD, OF LYNN, MASSACHUSETTS, ASSIGNOR TO UNITED SHOE MACHINERY CORPORATION, OF PATERSON, NEW JERSEY, A CORPORATION OF NEW JERSEY.

PRESS.

Application filed October 29, 1920. Serial No. 420,421.

*To all whom it may concern:*

Be it known that I, MILTON H. BALLARD, a citizen of the United States, residing at Lynn, in the county of Essex and State of Massachusetts, have invented certain Improvements in Presses, of which the following description, in connection with the accompanying drawings, is a specification, like reference characters on the drawings indicating like parts in the several figures.

This invention relates to presses and more particularly to machines for cutting sheet material by the use of freely movable dies.

A machine still commonly employed in cutting relatively wide sheet material arranged in superposed layers and other large pieces of material, such as hides, is known commercially as the beam dinker. It comprises characteristically a block of a length to accommodate material of a great range of widths upon which the material is supported during cutting operations, and a beam which is movable toward and from the block to force the die through the work and which in its position of rest is spaced from the block a distance just sufficient to permit of the introduction of work and of the largest die commonly employed in such cutting operations. Since the material which it is desired to cut must often be subjected to the most careful inspection before each cutting operation in order to plan the cutting to the best advantage from the standpoint of economy of material and since the die must be manipulated in such manner as to position it properly with relation to characteristics of the work and with respect to edge portions formed as a result of preceding cutting operations, it is clear that the machine does not fit the requirements from the standpoint of efficiency, inasmuch as the beam is so near the cutting block when in its upper position of rest that there is not sufficient space for the proper manipulation of the work and of the die nor for such inspection of the work as will enable the operator to secure the best results. A number of machines have been constructed to overcome the serious disadvantages of the beam machine but, so far as the facts are known, none of the constructions prior to this invention has gone into extensive use. Some of the prior machines are not properly responsive to control by the operator so that work performed with the aid of any of them is slow and laborious. Moreover, the construction in many cases is defective and deterioration is relatively rapid.

It is an object of this invention to provide a machine of the type described which will be relatively simple in construction, efficient in operation and free from the disadvantages which have characterized prior constructions.

Important features of the invention reside in a novel press organization wherein a presser member is movable bodily in such manner that it may co-operate with successive areas of a relatively extensive cutting block, and is operable through a single means for swinging the presser member in any direction over the block and for causing pressure applying operations, the construction and arrangement being such that sheet material of a wide range of widths may be cut with the minimum of effort on the part of the operator and under conditions which permit of proper inspection and manipulation of the work.

The illustrative machine comprises a presser member carrying controlling means for the machine and mounted rotatably on a post which is movable lengthwise of the cutting block so that the presser member not only swings over any given area of the cutting block but may be adjusted to operate with different areas of the cutting block from one end thereof to the other. In such a construction all the advantages of a single means for controlling both the lateral movements of the presser member over the block and its reciprocations toward and from the block are obtained and there is the additional advantage in the construction of a co-operation between a readily controllable presser member and a greatly extended cutting block capable of supporting fabrics and other sheet material of the greatest ranges of widths.

In another aspect the invention comprises a presser member mounted for co-operation with a beam and rotatable upon a post so constructed and arranged as to hold the presser member constantly in a plane parallel with the lower surface of the beam and contiguous thereto so that there is little if any lost motion and deterioration of the parts is reduced to a minimum. Conveniently, power means carried by the beam is provided for moving the presser member along the beam in either direction at the will of the operator, and, in the illustrative construction, the post for supporting the presser member is carried by the beam which applies pressure to the work through the presser member.

Other features of the invention and other combinations of parts will be described in the specification and pointed out in the appended claims.

In the drawings:—

Figure 1:
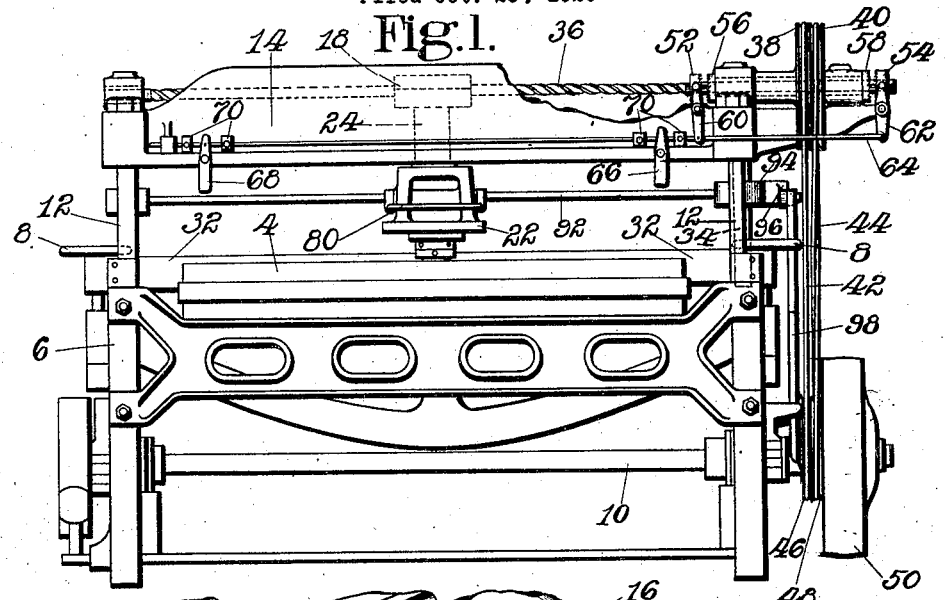
Figure 1 is a view in front elevation of a machine embodying the invention.

In the illustrative construction there is disclosed a work-supporting bed 4 which may be in the form of a cutting block of well-known construction adapted to receive the cutting edge of a die when the press is utilized as a cutting machine. Preferably the work supporting bed is supported adjustably on the frame 6 of the machine, adjustment in a vertical direction being accomplished through proper manipulation of the hand wheels 8 in accordance with an old and well known form of construction. Mounted in bearings in the frame 6 is a shaft 10 carrying eccentrics (not shown) for co-operation with yoke members (not shown) which connect the lower ends of the rods 12 in pairs at each end of the machine, the construction and arrangement being such that one revolution of the shaft 10 causes a complete reciprocation of the rods 12 whereby the beam 14 is caused to approach and recede from the work supporting bed in pressure applying operations. It will be understood that the rods 12 are fixedly secured at their upper ends to the beam 14 and that the whole construction thus far described is well known in the prior art.

Figure 2:
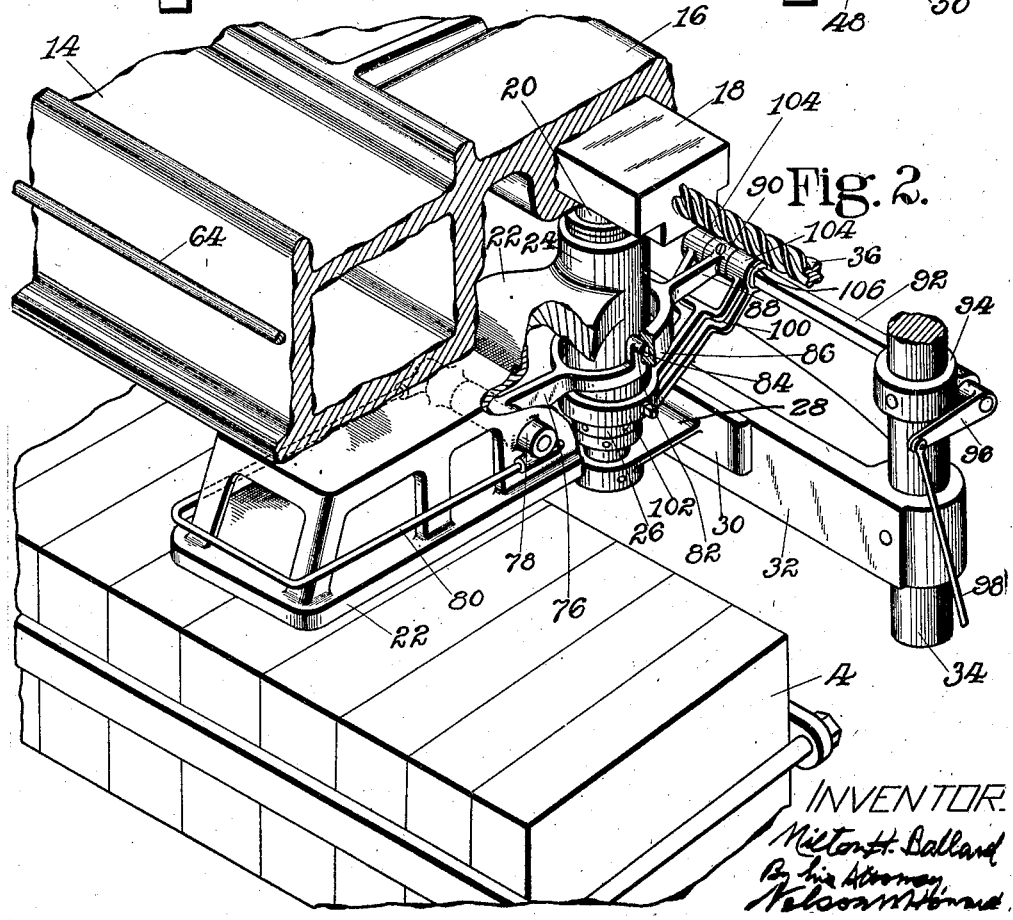
Fig. 2 is a perspective view partly in section showing the details of the mounting for the presser member.

In the illustrative embodiment of the invention, the beam 14 has integrally formed therewith or fixedly secured thereto an extension 16 which is provided with a T-shaped guideway for a correspondingly shaped block 18 which is adapted to be received in the slot and is slidable freely therealong. Fixedly secured to the block 18 is a post 20 which is vertically arranged and movable along one side of the work supporting bed 4. Rotatably carried by the post 20 is a pressure member 22 having a bearing 24 which surrounds the post and rests upon ball bearings carried by a ring 26 fixedly secured to the post. Serving as an additional support for the post there is fixedly attached to the lower end of the post a bracket 28 having a flat foot 30 which is in slidable contact with a bar 32 securely attached to posts 34 carried by the beam extension 16, one at each end thereof. As will be observed from an inspection of Figure 2, the construction and arrangement of the beam extension 16 of the post 20 and of the presser member 22 are such that the presser member 22 has an upper flat surface which is held just out of contact with a similar surface on the beam 14. It will be understood, therefore, that when the beam 14 is reciprocated upon rotation of the shaft 10 both the beam and the presser member 22 move toward and from the work supporting bed to apply pressure to work upon the bed and to release the work so that the latter may be adjusted prior to each pressure applying operation. Since the presser member is rotatable on the vertical post 20 a very considerable area of the bed 4 may be covered by the pressure member in its rotations about the vertical shaft and hence it is necessary to shift the presser member longitudinally of the work supporting bed relatively infrequently as compared with prior constructions.

It may be pointed out at this point that the pivoted presser member in the illustrative construction is much superior from the standpoint of efficiency than the ordinary sliding presser member of prior construction, both because the friction between the presser member and its support is much less in the pivoted construction and a much greater leverage is provided in the illustrated arrangement for moving the presser member laterally over the work supporting bed. For the reasons given the operator finds the presser member readily responsive to light pressure in movements toward and from operative position over the work, a fact which accounts in part for the high efficiency of the machine. When it is desired to operate upon work on the bed that cannot be reached simply by rotating the presser member 22 about its vertical axis, the latter is shifted laterally and, in the preferred construction, power means is provided for this purpose.

The power means referred to above for moving the presser member longitudinally of the work supporting bed comprises, in the construction shown, a single threaded member 36 which passes through and engages with the block 18. Clearly rotation of the member 36 in one direction will cause the block 18 to travel along its guideway in the beam extension 16, while rotation of the member 36 in the opposite direction will cause a corresponding change in the direction of travel of the block 18 and hence of the presser member 22 which is indirectly carried by the block. In the illustrative machine, the member 36 is carried in bearings provided by the beam extension 16 and at one of its ends the said member 36 is extended as a shaft to carry the sleeves of two pulleys 38 and 40 around which pass belts 42 and 44 respectively to pulley flanges 46 and 48 integral with or fixedly secured to the power pulley or fly wheel 50 loosely carried by the main shaft 10. Since the fly wheel 50 is continuously driven, the pulleys 38 and 40 are also constantly in motion, provision being made for running the pulleys in opposed directions through the twisting of one of the belts, in this case, the belt 44. Hence, in order to cause the member 36 to rotate in the desired direction it is necessary merely to connect the proper pulley therewith. This is accomplished in any well known manner, as for instance, by providing clutch members 52 and 54 pinned to rotate with the member 36 and slidable along the shaft extension of the member 36 into contact with co-operating clutch members 56 and 58 respectively which are integral with or securely attached to the sleeves of the respective pulleys 38 and 40. Operatively connected to the clutch parts 52 and 54, respectively, are levers 60 and 62 pivoted upon the beam 14 and both connected at their lower ends to a horizontal rod 64 which is mounted on the side of the beam 14 for sliding endwise movement. It will be clear that if the rod 64 is moved to the right the clutch member 54 at the upper end of lever 62 will be moved into engagement with its co-operating clutch member 58 on the sleeve of the pulley 40, thus connecting the shaft extension of the member 36 to said pulley for rotating in one direction while if the rod 64 be moved to the left in Figure 1, the clutch member 52 will be moved into co-operative relation with the clutch member 56 with the result that the other pulley 38 will be connected to the shaft extension of the member 36 to rotate the latter in the opposite direction. It is to be understood that the particular means for rotating the screw member 36 selectively in opposite directions forms no part of my invention and that any preferred or well known driving mechanism may be used for this purpose. It is to be noted, however, that the driving means for rotating the screw member 36 is mounted upon the beam of the press and moves with it during its reciprocations. The result is that the loosening of the belts 42 and 44 renders the rotatable devices incapable of driving the screw member 36 while the presser member is in contact with the work. Hence, if a workman through inadvertence or mistake should operate the controlling rod 64, while the presser member 22 is in contact with the work, and thus connect up one of the driving pulleys 38 or 40 with the screw member 36, no movement of the presser member laterally would take place because of the loosening of the belt as above pointed out. Hence one source of danger in machines of this type is eliminated. Preferably, a belt tightener (not shown) is provided for the belts 42 and 44 of such a construction as to exercise just sufficient pressure to prevent the belts from becoming disengaged from their respective pulleys during the descent of the beam. In the preferred construction, levers 66 and 68 are provided pivoted upon the beam 14 and operative to engage stops 70 adjustably secured to the rod 64, the said levers providing means by which the rod 64 may be readily shifted endwise in the proper direction to cause the engagement of the clutch for shifting the presser member in the desired direction along the work supporting bed.

In the illustrative embodiment of the invention, the starting means for the machine is mounted upon the presser member so as to be movable therewith and hence always accessible to the operator. As shown, this starting means comprises a lever 76 pivoted in trunnions 78 carried by the presser member 22 and is provided with a handle member 80 which extends around the end and two sides of the presser member, thus making it easy for the operator to control the presser member in whatever position it may occupy in its rotation about the vertical post 20. It will be observed, therefore, that the handle 80 is useful not only for starting the machine as will be hereinafter described but for enabling the operator to move the presser member manually and locate it in the exact desired relation with respect to the work. The rear end of the lever 76 is formed in a semi-circle and embraces the sleeve or bearing 24 of the presser member and has upward extensions which carry pins or studs 82 receivable in a continuous slot 84 in a circular member 86 which surrounds the said sleeve and which has a link extension 88 provided with a hub 90. Passing through the hub 90 and operatively connected thereto is a bar 92 which extends the full length of the machine and is mounted for rotation in bearings carried by rings 94 securely attached to the posts 34. Connected to one end of the bar 92 is a lever arm 96 to the outer end of which is attached a rod 98 which is operatively connected at its lower end to the clutch operating lever to control the clutch which is operative to connect the power pulley 50 to the shaft 10. It will be clear upon inspection of Figure 2 that depression of the forward end of the lever 76 or, in other words, downward movement of the handle 80 will result in rotating the bar 92 through the operative connections between the lever 76 and said bar by which the outer end of the lever 96 is raised and thus, through the connecting rod 98, the clutch parts tripped to connect the power pulley to the shaft. To assist in supporting the bar 92 there is provided a bracket 100 having an annular portion 102 fixedly secured to the ring 26 on the post 20 and carrying at its other end two spaced hub members 104 having inner cylindrical surfaces rotatably engaged with a sleeve 106 which is slidable upon the bar 92 and which is fixedly secured to the hub 90 of the link extension 88. The arrangement is clearly such that the bracket 100 furnishes support to the bar 92 closely adjacent to the point of application of the force applied through the connecting member 86, 88 to turn the said bar 92 as a part of the operation of tripping the clutch on the main shaft.

In utilizing the press as a cutting machine, the material to be cut, which may be leather or fabric arranged in a multiplicity of superposed layers, is placed upon the cutting block 4. After such inspection and repositioning of the material as may be necessary, a die is located in the desired position on the work. Then the presser member which has been located at one side during these preliminary operations is moved into position above the die simply by swinging it about its vertical axis in the post 20. For controlling the presser member the operator makes use of the handle 80 which is so constructed and arranged that it may be readily grasped to position the presser member. Since the handle 80 extends along the greater portion of two sides of the presser member and also around the free end thereof, the position of the presser member, even when it is located so as to lie parallel with the rear edge of the cutting block, presents no obstacle to the proper manipulation of the presser member through the handle 80. After the presser member has been located in the desired position above the die, a relatively slight downward movement of the handle 80 effects a tripping of the clutch on the main shaft with the result that pressure is applied to the die through the beam 14 and the presser member 22. Since the presser member swings about its post 20 over a very considerable area of the cutting bed 4, it is necessary to shift the supporting post 20 only a relatively few times in performing cutting operations along the whole length of the work supporting bed. To effect the shifting of the post 20 and, therefore, of the center about which the presser member swings, it is necessary merely to shift the rod 64 and for this purpose the operator grasps one of the handle levers 66 and 68 and pulls the lever in the direction in which it is desired that the presser member should travel.

Having thus described the invention, what is claimed as new and desired to be secured by Letters Patent of the United States is:—

1. In a machine of the class described, a work supporting bed, a presser member, starting means for the machine movable with the presser member, a vertical post for rotatably supporting the presser member and arranged for movement lengthwise of the bed, and means controlled by the starting means for causing reciprocation of the presser member toward and from the work supporting bed.

2. In a machine of the class described, a work supporting bed, a presser member movable toward and from the bed in pressure-applying operations, machine controlling means movable with the presser member, and a post mounted for movement lengthwise of the bed and arranged to support the presser member for rotation about a vertical axis.

3. In a machine of the class described, a work supporting bed, a beam extending longitudinally of the bed, a presser member, machine controlling means carried by the presser member, a post carried by the beam for movement longitudinally thereof and arranged rotatably to support the presser member, and means for causing relative reciprocation of the presser member and the work supporting bed timed through the operation of the machine controlling means.

4. In a machine of the character described, a work supporting bed, a beam extending longitudinally of the bed above the same, a post supported for movement longitudinally of the bed, a presser member rotatably mounted on the post and arranged to project into the space between the beam and the work supporting bed, starting means for the machine carried by the presser member, and means under the control of the starting means for reciprocating the beam and thus operating the presser member.

5. In a machine of the class described, a work supporting bed, a post mounted for movement along one side of the bed, a pressure member rotatably mounted on the post to swing into different operative positions with respect to the work supporting bed and movable also toward and from the bed in pressure-applying operations, and power means under the control of the operator for moving the post along the work supporting bed.

6. In a machine of the character described, a work supporting bed, a beam above the bed and extending longitudinally thereof, a block slidably mounted in the beam, a post secured to said block, a presser member rotatably mounted on the post and arranged to project into the space between the beam and the work supporting bed, and means for reciprocating the beam to cause pressure-applying operations of the presser member.

7. In a machine of the character described, a work supporting bed, a beam above the bed and extending longitudinally thereof, a vertically arranged post carried by said beam for movement longitudinally of the beam and work supporting bed, a presser member rotatably mounted on the post and arranged to be interposed between the beam and the bed, starting means for the machine movable with the presser member, and means controlled by the starting means for moving the beam and bed relatively to each other whereby the presser member may be caused to operate on work.

8. In a machine of the character described, a work supporting bed, a beam above the bed and extending longitudinally thereof, a power shaft, vertically reciprocable rods carrying the beam and operatively connected to the shaft, a vertically arranged post carried by the beam for movement lengthwise thereof, a support or backing for the lower end of the post, and a presser member rotatably mounted on the post and arranged to be interposed between the beam and the work supporting bed.

9. In a machine of the character described, a work supporting bed, a beam above the bed and extending longitudinally thereof, a power shaft, vertically reciprocable rods supporting the beam and operatively connected to the shaft, a post carried by the beam, and a presser member rotatably mounted on the post and arranged to present relatively large flat surfaces for co-operation with the beam and with the bed, respectively.

10. In a machine of the character described, a work supporting bed, a beam above the bed and extending longitudinally thereof, a vertically arranged post slidably mounted in the beam, a presser member rotatably mounted on the post and arranged to be interposed between the beam and the bed, means for moving the beam and the presser member toward and from the bed in pressure applying operations, and power means carried by the beam for moving the presser member lengthwise of the work supporting bed.

11. In a machine of the character described, a work supporting bed, a post supported for movement longitudinally of the bed, a presser member mounted upon the post, a power shaft having connections for reciprocating the presser member toward and from the bed, and power means under control of the operator for shifting the presser member along the work supporting bed.

12. In a machine of the character described, a work supporting bed, a beam above the bed and extending longitudinally thereof, a vertically arranged post mounted in the beam for movement along one side of the bed, a presser member rotatably mounted on the post, power means carried by the beam for moving the post selectively in either direction lengthwise of the bed, a power shaft, connections between the beam and the shaft for moving the beam and thereby causing pressure applying operations of the presser member, and a manually operable lever on the presser member for controlling said shaft.

13. In a machine of the character described, a work supporting bed, a vertically arranged post at one side of the bed, a presser member mounted on the post and movable toward and from the bed in pressure applying operations, and power means for moving the post longitudinally of the bed.

14. In a machine of the class described, a work supporting bed, a beam mounted for movement toward and from the bed, a presser member, a starting lever carried by the presser member, a vertical post carried by the beam for supporting the presser member, a shaft controlled by the starting lever, and connections between the beam and shaft for causing reciprocation of the beam and of the presser member toward and from the work supporting bed.

15. In a machine of the class described, a work supporting bed, a beam extending longitudinally of the bed, a presser member, a post mounted in the beam for movement lengthwise of the same and constructed and arranged to support the presser member with its upper surface constantly in a plane parallel with the under surface of the beam, and means for reciprocating the beam for causing pressure applying operations of the presser member.

16. In a machine of the class described, a work supporting bed, a beam extending longitudinally of the bed, a presser member arranged to be interposed between the beam and the work supporting bed, a manually operable starting member mounted on the presser member, a post carried by the beam for movement longitudinally thereof and arranged rotatably to support the presser member, and means for reciprocating the post, the beam, and the presser member toward and from the work supporting bed.

17. In a machine of the character described, a work supporting bed, a beam extending longitudinally of the bed above the same, a post supported by the beam, and a presser member rotatably mounted on the post and arranged to project into the space between the beam and the work supporting bed and held by the post constantly in parallelism with the under surface of the beam, a shaft, and connections between the beam and shaft for causing reciprocations of the beam and presser member.

18. In a machine of the class described, a work supporting bed, a beam above the bed and extending longitudinally thereof, a post carried by the beam, a presser member rotatably mounted on the post and arranged to be interposed between the beam and the work supporting bed, power means under control of the operator for moving the post along the work supporting bed, said post being operative to hold the presser member constantly in a plane parallel with the work supporting bed, a shaft, and connections between the beam and shaft to cause reciprocations of the beam and presser member.

19. In a machine of the character described, a work supporting bed, a beam above the bed and extending longitudinally thereof, a block slidably mounted in the beam, a post secured to said block, a presser member rotatably mounted on the post and arranged to project into the space between the beam and the work supporting bed, and a screw-threaded member passing through said block and arranged to be operated to cause the block to travel along the beam whereby the supporting post for the presser member is moved longitudinally of the bed.

20. In a machine of the character described, a work supporting bed, a beam above the bed and extending longitudinally thereof, a vertically arranged post carried by said beam for movement longitudinally of the beam and work supporting bed, a presser member rotatably mounted on the post and arranged to be interposed between the beam and the bed, starting mechanism for controlling the machine comprising a rod extending parallel with the beam, and a lever mounted on the presser member and operatively connected to the rod for initiating reciprocations of the presser member and beam with respect to the work supporting bed.

21. In a machine of the character described, a work supporting bed, a beam above the bed and extending longitudinally thereof, a power shaft, vertically reciprocable rods carrying the beam and operatively connected to the shaft, a vertically arranged post carried by the beam for movement lengthwise thereof and having a support at both its upper and lower ends, and a presser member rotatably mounted on the post and arranged to be interposed between the beam and the work supporting bed.

22. In a machine of the character described, a work supporting bed, a beam above the bed and extending longitudinally thereof, a power shaft, vertically reciprocable rods supporting the beam and operatively connected to the shaft, a second beam extending parallel with the first-mentioned beam, a post carried by one of said beams and having a slidable bearing on the other beam, and a presser member rotatably mounted on the post and arranged to be interposed between the first-mentioned beam and the work supporting bed.

23. In a machine of the character described, a work supporting bed, a beam above the bed and extending longitudinally thereof, a vertically arranged post slidably mounted in the beam, a presser member rotatably mounted on the post and arranged to be interposed between the beam and the bed, means for moving the beam and the presser member toward and from the bed in pressure applying operations, a starting mechanism for the machine comprising a rod arranged parallel with the beam and movable therewith, and a manually operable lever mounted on the rotatable presser member and operatively connected to said rod for starting the machine.

24. In a machine of the character described, a work supporting bed, a beam above the bed and extending longitudinally thereof, a post slidably supported by the beam, a presser member rotatably mounted upon the post, a power shaft having connections for reciprocating the beam and the presser member toward and from the bed, a starting mechanism for the machine comprising a rod parallel with the beam and vertically movable therewith, a manually operable lever mounted on the presser member, and connections between the lever and said rod comprising a link slidable on the rod and having a portion surrounding the post and with which the lever is operatively connected.

25. In a machine of the character described, a work supporting bed, a beam above the bed and extending longitudinally thereof, a vertically arranged post mounted in the beam for movement along one side of the bed, a presser member rotatably mounted on the post, power means carried by the beam for moving the post lengthwise thereof, a power shaft, and connections between the beam and the shaft for moving the beam, the post, and the presser member toward and from the work supporting bed in pressure applying operations.

26. In a machine of the character described, a work supporting bed, a vertically arranged post at one side of the bed, a presser member rotatably mounted on the post, power means for moving the post longitudinally of the bed, and power means for reciprocating the post and presser member toward and from the work supporting bed.

27. In a machine of the class described, a work supporting bed, a beam movable toward and from the bed, a presser member mounted on the beam to move therewith in pressure applying operations, means for causing reciprocation of the beam comprising a shaft, power means for moving the presser member along the beam comprising a pulley carried by the beam, and a belt arranged to pass around the pulley and to be driven from the shaft, the construction and arrangement being such that as the beam moves toward the work supporting bed the belt is slackened and hence the power means for moving the presser member lengthwise of the beam is rendered inoperative.

28. In a machine of the character described, a work supporting bed, a post supported for movement longitudinally of the bed, a presser member mounted upon the post, a power shaft having connections for reciprocating the presser member toward and from the bed, power means for shifting the presser member and post longitudinally of the work supporting bed, and members one at each end of the machine for controlling the last-mentioned power means.

29. In a machine of the character described, a work supporting bed, a beam mounted for movement toward and from the bed, a presser member, a starting lever carried by the presser member, a vertical post carried by the beam for supporting the presser member for rotative movements about the axis of the vertical post, a shaft controlled by the starting lever, and connections between the beam and shaft for causing reciprocation of the beam and of the presser member toward and from the work supporting bed upon manipulation of the starting lever.

30. In a machine of the character described, a work supporting bed, a vertical post at the rear of the bed, a presser member carried rotatively by the post, power means comprising a beam co-extensive with the work supporting bed for causing reciprocation of the presser member toward and from the bed, and a member movable with the presser member for controlling the power means.

31. In a machine of the character described, a work supporting bed, a post arranged vertically at one side of the bed, a presser member rotatably mounted on the post to project over the bed from the post at one side thereof, power means for reciprocating the post and presser member, and a member carried by the presser member for controlling the power means.

In testimony whereof I have signed my name to this specification.

MILTON H. BALLARD.